United States Patent
Ganti et al.

(10) Patent No.: US 7,266,606 B2
(45) Date of Patent: Sep. 4, 2007

(54) CASCADED POLICING SYSTEMS AND METHODS

(75) Inventors: Sudhakar Ganti, Kanata (CA); Byoung-Joon Lee, Nepean (CA); Barry Mark, Kanata (CA)

(73) Assignee: Tropic Networks Inc., Kanata, Ontario (CA)

( * ) Notice: Subject to any disclaimer, the term of this patent is extended or adjusted under 35 U.S.C. 154(b) by 641 days.

(21) Appl. No.: 09/893,584

(22) Filed: Jun. 29, 2001

(65) Prior Publication Data

US 2003/0018801 A1   Jan. 23, 2003

(51) Int. Cl.
*G06F 15/173* (2006.01)

(52) U.S. Cl. ............... 709/226; 709/223; 709/232; 370/229; 370/230.1; 370/235; 370/465

(58) Field of Classification Search ........... 370/412, 370/468, 465; 709/223, 224
See application file for complete search history.

(56) References Cited

U.S. PATENT DOCUMENTS

| | | | | |
|---|---|---|---|---|
| 5,274,644 A * | 12/1993 | Berger et al. | ............ | 370/230 |
| 5,530,695 A * | 6/1996 | Dighe et al. | ............ | 370/232 |
| 5,796,719 A * | 8/1998 | Peris et al. | ............ | 370/231 |
| 5,850,399 A * | 12/1998 | Ganmukhi et al. | ........ | 370/412 |
| 5,864,540 A * | 1/1999 | Bonomi et al. | ............ | 370/235 |
| 5,909,443 A * | 6/1999 | Fichou et al. | ............ | 370/412 |
| 5,978,356 A * | 11/1999 | Elwalid et al. | ............ | 370/230 |
| 6,041,040 A * | 3/2000 | Beshai et al. | ............ | 370/232 |
| 6,067,301 A * | 5/2000 | Aatresh | ............ | 370/418 |
| 6,072,773 A * | 6/2000 | Fichou et al. | ............ | 370/230 |
| 6,119,235 A * | 9/2000 | Vaid et al. | ............ | 726/11 |
| 6,324,165 B1* | 11/2001 | Fan et al. | ............ | 370/232 |
| 6,438,106 B1* | 8/2002 | Pillar et al. | ............ | 370/232 |
| 6,438,134 B1* | 8/2002 | Chow et al. | ............ | 370/412 |
| 6,463,470 B1* | 10/2002 | Mohaban et al. | ........ | 709/223 |

(Continued)

FOREIGN PATENT DOCUMENTS

WO   WO 0230061 A1 *   4/2002

OTHER PUBLICATIONS

"Quality of service in ATM networks : state-of-the-art traffic management", Natalie Giroux, Sudhakar Ganti, 1999 by Prentice-Hall PtR, pp. 38 to 46 and 61.

(Continued)

*Primary Examiner*—Bunjob Jaroenchonwanit
*Assistant Examiner*—Dohm Chankong
(74) *Attorney, Agent, or Firm*—Victoria Donnelly

(57) ABSTRACT

Cascaded policing methods and systems are provided which allow lower priority traffic to benefit from otherwise unused capacity allocated to higher priority traffic of a given customer/service with multiple classes of service. The method involves policing packets of a first class in accordance with at least one policing parameter associated with the first class, and policing packets of a second class in accordance with at least one policing parameter associated with the second class in a manner which gives to the second class at least a portion of a traffic throughput afforded to the first class by at least one of said at least one policing parameter, such as a rate guarantee or burst tolerance, associated with the first class of traffic which is not being used by the packets of the first class. The method is easily adapted to an arbitrary number of different traffic classes.

8 Claims, 3 Drawing Sheets

U.S. PATENT DOCUMENTS

| | | | | |
|---|---|---|---|---|
| 6,594,234 B1* | 7/2003 | Chard et al. | ................. | 370/236 |
| 6,614,790 B1* | 9/2003 | Veres et al. | .............. | 370/395.2 |
| 6,647,424 B1* | 11/2003 | Pearson et al. | ............. | 709/232 |
| 6,683,884 B1* | 1/2004 | Howard | ...................... | 370/412 |
| 6,826,147 B1* | 11/2004 | Nandy et al. | ................ | 370/229 |
| 6,834,053 B1* | 12/2004 | Stacey et al. | ............ | 370/395.4 |
| 6,901,052 B2* | 5/2005 | Buskirk et al. | ............. | 370/235 |
| 7,042,848 B2* | 5/2006 | Santiago et al. | ............ | 370/253 |
| 7,123,583 B2* | 10/2006 | Hoar et al. | ................. | 370/230 |
| 2002/0186661 A1* | 12/2002 | Santiago et al. | ............ | 370/252 |
| 2002/0191622 A1* | 12/2002 | Zdan | ......................... | 370/401 |
| 2003/0086140 A1* | 5/2003 | Thomas et al. | ............ | 359/167 |

OTHER PUBLICATIONS

"Specification of Guaranteed Quality of Service", Shenker, et al., RFC 2212, Standards Track, Sep. 1997, pp. 1 to 20.

"An Architecture for Differentiated Services", Blake, et al., RFC 2475, Informational, Dec. 1998, pp. 1 to 36.

"A Framework for Internet Traffic Engineering", Daniel O. Awduche, et al., Mar. 2001, pp. 1 to 63.

Ananthanarayanan Ramanathan et al., "Active Resource Management for the Differentiated services environment", Proceeding of the ICoIC, Jun. 25-28, 2001.

Proceeding of the International Conference on Internet Computing (IC2001), Nevada, USA, Jun. 25-28, 2001, pp. 680-683.

* cited by examiner

CASCADED POLICING SYSTEMS AND METHODS

FIELD OF THE INVENTION

The invention relates to the policing of data flows, for example flows of IP (Internet Protocol) packets, in a manner delivering class of service, also referred to as quality of service, differentiability.

BACKGROUND OF THE INVENTION

It is now a common objective in IP networks to provide the option of a guaranteed QoS (quality of service). See for example, 1) "Quality of service in ATM networks: State-of-the-art Traffic Management", Natalie Giroux, Sudhakar Ganti, 1999 by Prentice-Hall PTR, pages 38-46 and 61; 2) "Specification of Guaranteed Quality of Service", Shenker, et al, RFC 2212, Standards Track, September 1997, pages 1 to 20; and 3) "An Architecture for Differentiated Services", Blake, et al, RFC 2475, Information al, December 1998, pages 1 to 36.

Associated with QoS delivery is the concept of traffic "policing", (also synonymous with "marking" or "metering") whereby a service provider ensures that at the same time a customer is receiving the QoS paid for, they are not in certain respects exceeding that QoS.

Referring now to FIG. 1, shown is an example of a customer's traffic source 10 generating traffic 14 which is sent to a network 12 through a connection 15. During the setup of such a connection 15, typically the customer has requested/negotiated certain traffic parameters for the traffic 14, such as bandwidth, delay etc., and pays for the connection accordingly. The network 12 has a policing node 16 at which the traffic 14 is policed in accordance with the negotiated parameters. Typically the policing node 16 is the first point of access within the network 12 for the traffic 14.

The policing node 16 has a policer (synonymous with "meter" or "marker") 18 responsible for marking packets which constitute traffic 14 as either conforming, non-conforming, or partially conforming. The policer 18 is typically implemented using a leaky bucket mechanism. Each time a packet of traffic 14 arrives, a bucket is filled by a number of policing units, or tokens, corresponding to an allowed burst of data. The bucket continuously leaks tokens at a rate reflective of the bandwidth or rate to be provided. In the event the bucket overflows, packets are marked as non-conforming. Packets which arrive while the bucket is not overflowing are marked as conforming. Typically, allowances are made by the policer 18 to realize both an average rate (sometimes referred to as the committed information rate or CIR), and a burst tolerance (BT). Burst tolerance can be provided for example by allowing the bucket to accumulate up to the maximum token bucket size. This allows packets to be transmitted at a rate greater than the average for a short period of time.

Existing policing algorithms are designed to police a single traffic flow to a single set of negotiated specifications. When there are multiple traffic flows from a single customer, multiple independent policers have been employed.

SUMMARY OF THE INVENTION

Embodiments of the invention provide cascaded policing methods and systems which allow lower priority traffic to benefit from otherwise unused capacity allocated to higher priority traffic of a given customer/service with multiple classes of service.

A first broad aspect of the invention provides a method of policing packet traffic. The method involves policing packets of a first class in accordance with at least one policing parameter associated with the first class, and policing packets of a second class in accordance with at least one policing parameter associated with the second class in a manner which gives to the second class at least a portion of a traffic throughput afforded to the first class by at least one of said at least one policing parameter associated with the first class of traffic which is not being used by the packets of the first class.

The policing parameters under consideration might for example be rate guarantees provided to different traffic classes. The policing parameters might also include burst tolerances of the different traffic classes.

The method is easily adapted to an arbitrary number of different traffic classes.

Another broad aspect of the invention provides a method of policing traffic involving defining a traffic class rate guarantee for each of a plurality of traffic classes to be provided by a service, and a service rate guarantee for the service, and policing combined traffic containing traffic of each of the plurality of traffic classes in a manner which guarantees each class its respective traffic class rate guarantee, and in a manner which guarantees the service rate guarantee for the combined traffic. This effectively amounts to a two-tier rate guarantee.

Preferably each of a respective combined traffic comprising a given traffic class plus all conforming higher class traffic, the policing being done at a rate equal to the traffic class rate guarantee for that traffic class plus the traffic class rate guarantees for at least one and preferably all higher classes of traffic.

In one embodiment, a method of policing a plurality N of traffic classes Ci, each having a respective rate guarantee Ri, i=1, . . . , N, N>=2 is provided. The method involves policing traffic of class C1 according to rate R1, and for each other class Ci, policing traffic of class Ci plus conforming traffic of class(es) C1, . . . , Ci−1 according to an aggregate rate part of $$RAi = \sum_{i=1}^{N} Ri.$$

This method may be adapted to include consideration of burst tolerance. For example if each traffic class Ci has a respective burst tolerance BTi, the method preferably further involves policing traffic of class C1 according to BT1, and for each other class Ci, policing traffic of class Ci plus conforming traffic of class(es) C1, . . . , Ci−1 according to an aggregate burst tolerance $$BAi = \sum_{i=1}^{N} BTi.$$

Embodiments of the invention also provide a policer which might be any suitable combination of hardware and/or software, and a network node adapted to implement any of the above described methods. A processing platform readable medium having stored thereon instructions for a processing platform to implement any of the above described methods is also provided.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
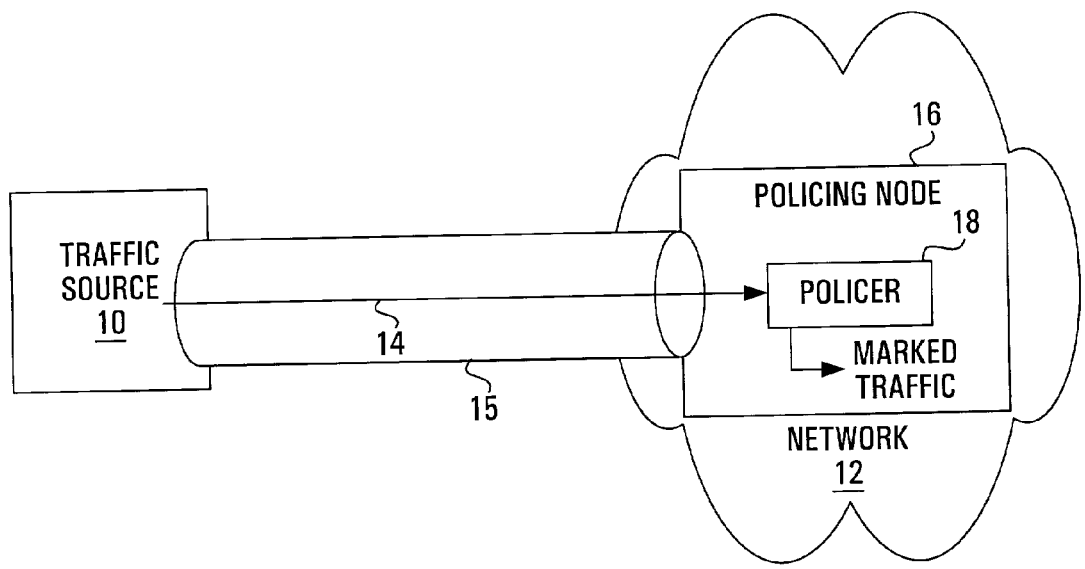
FIG. 1 is a schematic diagram of a conventional policing arrangement.
Figure 2:
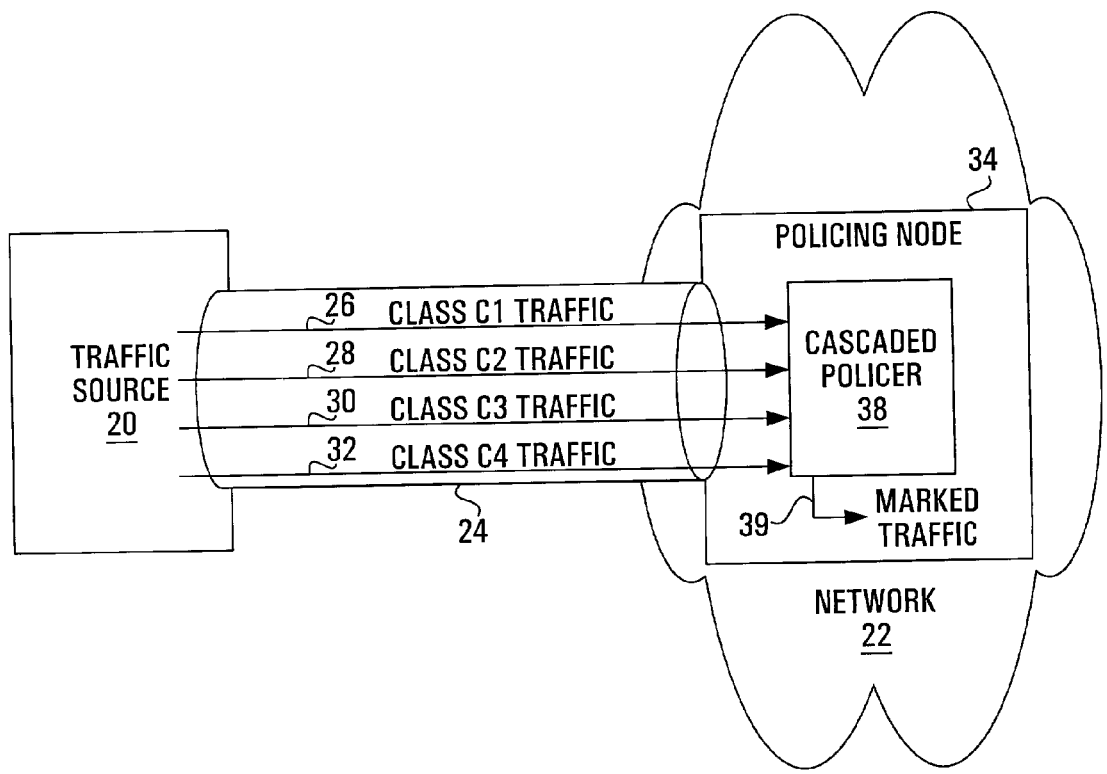
FIG. 2 is a schematic diagram of a system in which traffic is policed according to a method provided by an embodiment of the invention.

Embodiments of the invention provide for the aggregate policing of multiple traffic classes within a service. A service is defined as a data communications path through a network. It is desirable to provide class of service differentiation within a service. Class of service differentiation involves treating sub-flows of packets generated within the service in a different manner. Referring now to FIG. 2, shown is an example of a traffic source 20 associated with service 24. A customer subscribing to the service 24 provided by network 22 generates traffic at traffic source 20. The service 24 includes four traffic classes, indicated logically by class C1 traffic 26, class C2 traffic 28, class C3 traffic 30 and class C4 traffic 32 flowing between the traffic source 20 and the network 22. The traffic classes 26, 28, 30, 32 collectively constitute the service 24 being provided. Although FIG. 1 only shows traffic ingress to the network 22, complete service delivery would involve delivering the traffic through the network to one or more destinations.

In a preferred embodiment of the invention, the traffic consists of IP packets, and the traffic classes might for example be IETF (Internet Engineering Task Force) Diff-Serve (Differentiated Services) classes EF (expedited forwarding), AF1 (assured forwarding 1), AF2 (assured forwarding 2), and BE (best effort). Of course, other packet types and traffic classes may alternatively be employed, such as ATM and Frame Relay.

During the setup of such a service 24, certain traffic parameters are requested/negotiated for each of the traffic classes, such as bandwidth, delay etc., and the service is paid for accordingly. The network 22 has a policing node 34 at which the traffic associated with each traffic class service 24 is policed in accordance with the negotiated parameters. Typically the policing node 34 is the first point of access within the network 22 for the traffic of service 24. Policing of the traffic classes 26, 28, 30, 32 within policing node 34 is performed by a cascaded policer 38 which outputs marked traffic 39.

Figure 3:
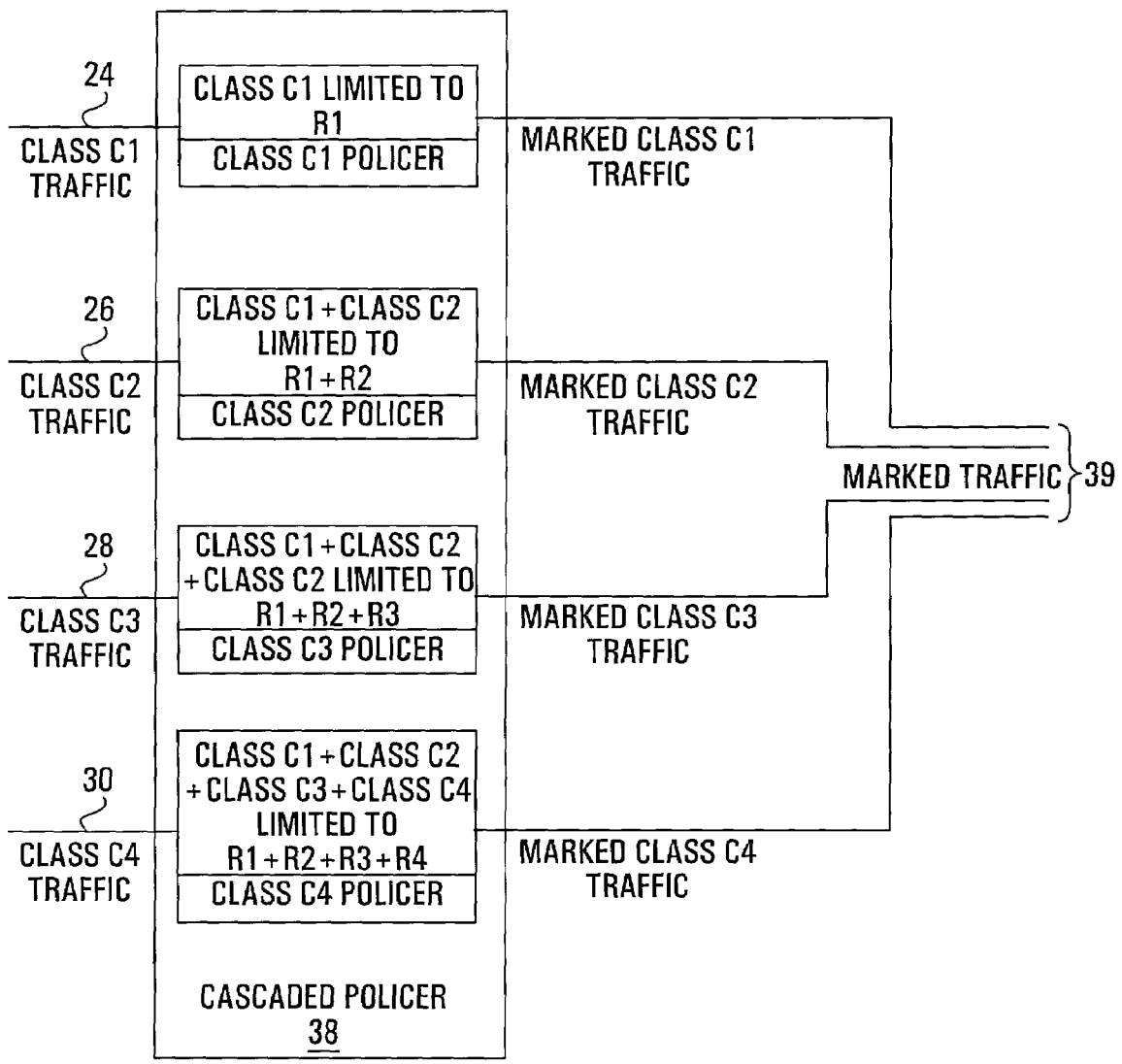
FIG. 3 is a logical view of the functionality of the cascaded policer of FIG. 2.

A logical view of the functionality of the cascaded policer 38 is provided in FIG. 3. The four traffic classes 26, 28, 30, 32 are shown entering the cascaded policer 38. According to this embodiment of the invention, policing is performed by the cascaded policer 38 in a manner such that if a higher priority class does not use the full capacity rate allocated (and thus paid for), unused capacity is allowed to be used by lower classes. For the purpose of this example, it is assumed that the order of priority for the traffic classes from highest to lowest is Class C1, Class C2, Class C3 and then Class C4. It is assumed that for Class C1, a CIR of R1 has been paid for, meaning that regardless of what is going on with the other classes, Class C1 is going to be allowed to transmit R1. Similarly, it is assumed that for Class C2, a CIR of R2 has been paid for, meaning that regardless of what is going on with the other classes, Class C2 is going to be allowed to transmit R2. It is assumed that for Class C3, a CIR of R3 has been paid for, meaning that regardless of what is going on with the other classes, Class C3 is going to be allowed to transmit R3. It is assumed that Class C4 is a best effort class which has a guaranteed CIR of R4 (which may be zero).

The policing is to be performed in accordance with the following rules:

Class C1 traffic<R1;

Conforming Class C1+Class C2<R1+R2;

Conforming Class C1+Conforming Class C2+Class C3<R1+R2+R3;

Conforming Class C1+Conforming Class C2+Conforming Class C3+Class C4<R1+R2+R3+R4.

Another way of expressing this for an arbitrary number N of classes is as follows:

police traffic of class C1 according to rate R1;

for each other class Ci police traffic of class Ci plus conforming traffic of class(es) C1, . . . , Ci−1 according to an aggregate rate $$RAi = \sum_{i=1}^{N} Ri.$$

In the above, the first rule means that class C1 traffic is policed to R1. Traffic beyond R1 will be marked as non-conforming. Traffic below R1 will be marked as conforming.

The second rule effectively means that class C2 traffic is policed to R1+R2—conforming class C1 traffic. Traffic beyond this amount will be marked as non-conforming. Traffic below this amount will be marked as conforming.

The third rule effectively means that class C3 traffic is policed to R1+R2+R3—conforming class C1 traffic—conforming class C2 traffic. Traffic beyond this amount will be marked as non-conforming. Traffic below this amount will be marked as conforming.

Finally, the fourth rule effectively means that class C4 traffic is policed to R1+R2+R3+R4—conforming class 1 traffic—conforming class C2 traffic—conforming class C3 traffic. Traffic beyond this amount will be marked as non-conforming. Traffic below this amount will be marked as conforming.

The effect of policing in this manner is that a customer has paid for an amount R1 of class C1 traffic capacity, and if this is not used, rather than policing class C2 at its nominal rate of R2, class C2 traffic is given the opportunity to be transmitted on the left over capacity paid for class C1 and so on.

Effectively, a two-tier rate guarantee mechanism is provided, with each class of service being given its own respective rate guarantee, and the service as a whole also being given a rate guarantee which is equal to the sum of the individual rate guarantees.

Figure 4:
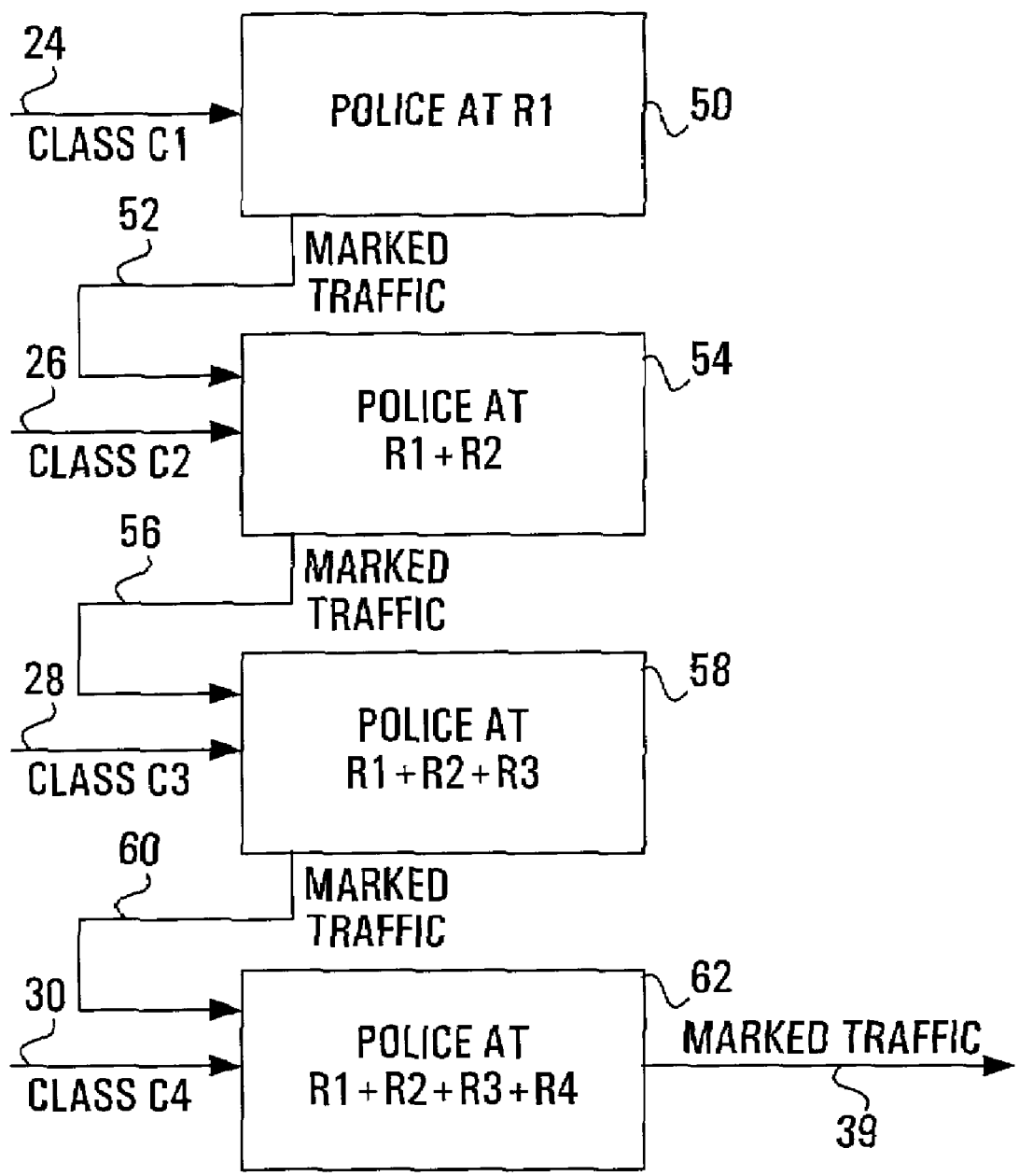
FIG. 4 is a traffic flow diagram illustrating a preferred method of implementing the cascaded policer of FIG. 2.

There are many ways of practically achieving these rules. One example is given in the traffic flow diagram of FIG. 4. Class C1 traffic 24 enters a first policer 50 which marks traffic as either conforming or non-conforming according to rate R1. The non-conforming traffic may be dropped right there, or may be left in the packet stream for the network to decide what to do with it at a later time. The traffic thus marked 52, and class C2 traffic 26 enters a second policer 54 which polices the combination of class C2 traffic 26 and conforming class C1 traffic at R1+R2. Any non-conforming class C1 traffic in marked traffic 52 is ignored. Conforming Class C1 traffic is already marked as conforming, so only class C2 traffic can be marked non-conforming by the second policer 54 producing marked traffic 56. Then, the combination of conforming class C1 and conforming class C2 and class C3 traffic 28 is policed at R1+R2+R3 by a third policer 58 producing marked traffic 60. Finally, the combination of conforming class C1, conforming class C2, conforming class C3, and class C4 traffic 30 is policed at R1+R2+R3+R4 by a fourth policer 62 producing marked traffic 39.

Preferably, the burst tolerance is cascaded in the same manner as the committed information rates. Thus, if in the absence of any other considerations class C1, class C2, class C3 and class C4 have burst tolerances of BT1, BT2, BT3, and BT4 respectively, then the policing is performed such that class C1 is given a burst tolerance of BT1, the combination of class C1 and class C2 is given a burst tolerance of BT1+BT2, the combination of class C1, class C2 and class C3 is given a burst tolerance of BT1+BT2+BT3, and finally, the combination of class c1, class C2, class C3 and class C4 is given a burst tolerance of BT1+BT2+BT3+BT4.

Mathematically, this can be expressed as follows for an arbitrary number N of traffic classes:

police traffic of class C1 according to BT1;

for each other class Ci, policing traffic of class Ci plus conforming traffic of class(es) C1, . . . , Ci−1 according to an aggregate burst tolerance $$BAi = \sum_{i=1}^{N} BTi.$$

Specific examples have been given in which both the committed information rate and the burst tolerance of multiple traffic classes are considered in an aggregate manner. There may be other parameters which may be similarly cascaded.

In the described embodiment, there are four traffic classes which are being policed by the cascaded policer. More generally, any number of traffic classes may be policed in this manner.

Also, the above described embodiment, specific mechanisms and methods of allocating all of a class's unused capacity to lower priority classes have been provided. More generally, embodiments of the invention include any method of policing which results in some or all of a class's unused capacity being made available to lower priority classes.

Numerous modifications and variations of the present invention are possible in light of the above teachings. It is therefore to be understood that within the scope of the appended claims, the invention may be practised otherwise than as specifically described herein.

We claim:

1. An apparatus for policing transfer of packets, each said packet belonging to one of a plurality of traffic classes, said apparatus comprising:
   a first policer for marking individual arriving first-class packets belonging to a first traffic class from among said plurality of traffic classes, which packets conform to a first committed information rate as conforming first-class packets; and
   a second policer receiving a combination of said conforming first-class packets and arriving second-class packets belonging to a second traffic class from among said plurality of traffic classes, said second policer marking individual second-class packets, which second-class packets together with said conforming first-class packets conform to a sum of said first committed information rate and a second committed information rate, as conforming second-class packets.

2. An apparatus for policing transfer of packets, each packet belonging to one of a plurality of traffic classes where each traffic class is allocated a respective committed information rate, said apparatus comprising:
   a cascade of policers having a one-to-one correspondence to said traffic classes, wherein
   a first policer of said cascade of policers identifies packets of a first traffic class from among said plurality of traffic classes, which packets conform to a first committed information rate, as con forming packets; and
   wherein each successive policer of said cascade of policers:
   receives a combination of arriving packets of a corresponding traffic class and conforming packets identified by all preceding policers; and
   identifies conforming packets of said corresponding traffic class which packets of said corresponding traffic class together with said conforming packets identified by all preceding policers, conform to a sum of committed information rates of all preceding traffic classes and a committed information rate of said corresponding traffic class.

3. An apparatus for policing a plurality of traffic classes of a service, said apparatus comprising:
   a first policer for marking packets of a first traffic class from among said plurality of traffic classes, which packets collectively conform to a first pre-assigned guaranteed service rate, as conforming packets; and
   a plurality of successive policers each successive policer provided for a specific traffic class from among said plurality of traffic classes, said each successive policer marking packets of said specific traffic class, which packets of said specific traffic class taken in combination with packets of preceding traffic classes marked as conforming packets conform to an aggregate service rate, as conforming packets of said specific traffic class.

4. The apparatus of claim 3 wherein said aggregate service rate equals a sum of guaranteed service rates of said specific traffic class and said preceding traffic classes, including said first pre-assigned guaranteed service rate.

5. The apparatus of claim 4 further comprising a leaky-bucket mechanism associated with said first policer and a leaky-bucket mechanism associated with each of said successive policers.

6. The apparatus of claim 5 wherein said marking of said packets of said first traffic class is performed by means of said leaky-bucket mechanism associated with said first policer and said marking of said packets of said specific traffic class is performed by means of said leaky-bucket mechanism associated with said each of said successive policers.

7. An apparatus for policing packets of a plurality of traffic classes of a service, said traffic classes arranged in a predetermined order, said apparatus comprising:
   a first policer assigned a policer service rate equal to a pre-assigned service rate of a first traffic class of said plurality of traffic classes; and
   a plurality of succeeding policers each succeeding policer allocated to a corresponding traffic class and assigned a respective policer service rat determined as a sum of a pre-assigned service rate of said corresponding traffic class and a policer service rate of an immediately preceding policer, wherein:

said first policer marks packets of said first traffic class, which packets conform to said pre-assigned service rate of said first traffic class, to produce an output of said first policer comprising packets marked as conforming packets; and wherein said each policer:

combines packets of said corresponding traffic class with packets marked as conforming packets at outputs of all preceding policers including said first policer to produce a cumulative packet flow; and determines conformance of said cumulative packet flow to said respective policer service rate; and marks packets of said corresponding traffic class as conforming packets, to produce an output comprising packets marked as conforming packets, according to said conformance of said cumulative packet flow.

8. The apparatus of claim 7 wherein said output of said first policer and said output of said each succeeding policer include packets marked as nonconforming packets.

* * * * *